United States Patent [19]
Masunaga

[11] Patent Number: 4,479,704
[45] Date of Patent: Oct. 30, 1984

[54] TRIGGER DEVICE FOR ELECTRONIC FLASH
[75] Inventor: Makoto Masunaga, Tokyo, Japan
[73] Assignee: Canon Kabushiki Kaisha, Tokyo, Japan
[21] Appl. No.: 540,703
[22] Filed: Oct. 11, 1983

Related U.S. Application Data
[63] Continuation of Ser. No. 382,676, May 27, 1982, abandoned.

[30] Foreign Application Priority Data
Jun. 18, 1981 [JP] Japan ................. 56-94886
[51] Int. Cl.³ ............................................ G03B 15/03
[52] U.S. Cl. .................................................. 354/137
[58] Field of Search ................. 354/129, 133, 137, 413

[56] References Cited
U.S. PATENT DOCUMENTS
4,346,971 8/1982 Johnson et al. ................ 354/133 X Primary Examiner—Michael L. Gellner
Attorney, Agent, or Firm—Toren, McGeady and Stanger

[57] ABSTRACT

A trigger device for an electronic flash so designed that a shutter control signal produces a signal for opening and closing an electromagnetically driven shutter and a timer for delaying the shutter control output signal are provided in such a manner that the flash emits the light in response to the shutter closing operation control signal or the delayed signal from the timer which is later than the other when both signals are produced.

8 Claims, 3 Drawing Figures

TRIGGER DEVICE FOR ELECTRONIC FLASH

This is a continuation, of application Ser. No. 382,676, filed May 27, 1982, now abandoned.

BACKGROUND OF THE INVENTION

1. Field of the Invention:

The present invention relates to a trigger device for an electronic flash, particularly suited to daylight flash-photography for cameras with an electromagnetically driven shutter and an electric flash trigger signal.

2. Description of the Prior Arts:

Generally, in cameras connectable to flash devices or having a built-in flash device, the flash synchronization is carried out via a contact in operative engagement with the members which drive the shutter blades or the shutter curtain.

Recently, the shutter having electromagnetically driven shutter blades have been proposed and brought into practice. This kind of shutter has been disclosed, for example, in U.S. Patent Application Ser. No. 114,497 filed on Jan. 23, 1980 and U.S. Pat. Application Ser. No. 75,943 filed on Aug. 7, 1980.

In an electromagnetic shutter, the shutter blades are closed by a spring and opened by an electromagnetic force, return to the totally closed position occurs when the electromagnetic force is released.

However, with this construction it is impossible to obtain a large driving force. Furthermore, because the time during which the electromagnetic force is applied to the shutter is changed, to vary the aperture of the shutter in accordance with the brightness, it is difficult to open and close the synchronization contact mechanically. There is also a possibility that the shutter blades are not controlled up to the totally opened position depending on the duration of the electromagnetic force application.

In order to overcome this difficulty, as in the case of the system disclosed in U.S. Patent Application Ser. No. 298,532 filed on Sept. 1, 1981, an electrically produced trigger signal for the flash, said signal produced when the release of the electromagnetic force, occurs may be considered.

In the case of the shutter which is opened directly by the electromagnetic force, the blades continue the opening operation for a while due to the moment of inertia and begin closing with the strength of the spring only after the blades have no more inertia if the electromagnetic force is released before the arrival at the totally opened position, however, the shutter blades assume the closing operation immediately after the electromagnetic force for driving the shutter blades is released when the shutter blades are totally opened. Consequently, it is necessary to determine the time for applying the electromagnetic force, taking the moment of inertia into consideration. If the object field brightness is so high that the shutter blades open small, the electromagnetic force is released before the shutter blades have opened, whereby the shutter blades open inertially.

Here also, the trigger signal for the flash is a problem. Excepting the case where the shutter blades are totally opened, where the electromagnetic force is released before the shutter blades have been totally opened there is a possibility that the trigger signal for the flashlight is delivered before the blades have been opened at all. For example, if the flash is made use of as the auxiliary light for a backlighted object under daylight, there is a possibility that only the background is bright and the object to be photographed is dark.

SUMMARY OF THE INVENTION

It is accordingly an object of the present invention to provide an improved trigger device for a flash which overcomes the disadvantages of prior art devices.

It is another object of the present invention to provide an improved trigger device for a flash which enables the flash to synchronize even if the object field is so bright that the shutter opening is remarkably small.

It is further another object of the present invention to provide a trigger device for a flash which does not produce the trigger signal for the flash during the time necessary for the electromagnetically driven shutter blades to open, even if the electromagnetic force is released with the shutter closing signal, but produces the signal only after the lapse of the above time in order to obtain a sure synchronization.

These and further objects and features of the present invention will become apparent from the following detailed descriptions of an embodiment thereof with reference to the accompanying drawings.

BRIEF DESCRIPTION OF THE DRAWINGS

FIG. 2 shows the case where the shutter current supply signal is comparatively long, while FIG. 3 shows the case where the signal is so short that the shutter blades open only with the moment of inertia.

DESCRIPTION OF THE PREFERRED EMBODIMENTS

The present invention will be explained in detail in accordance with the accompanying drawings.

Figure 1:
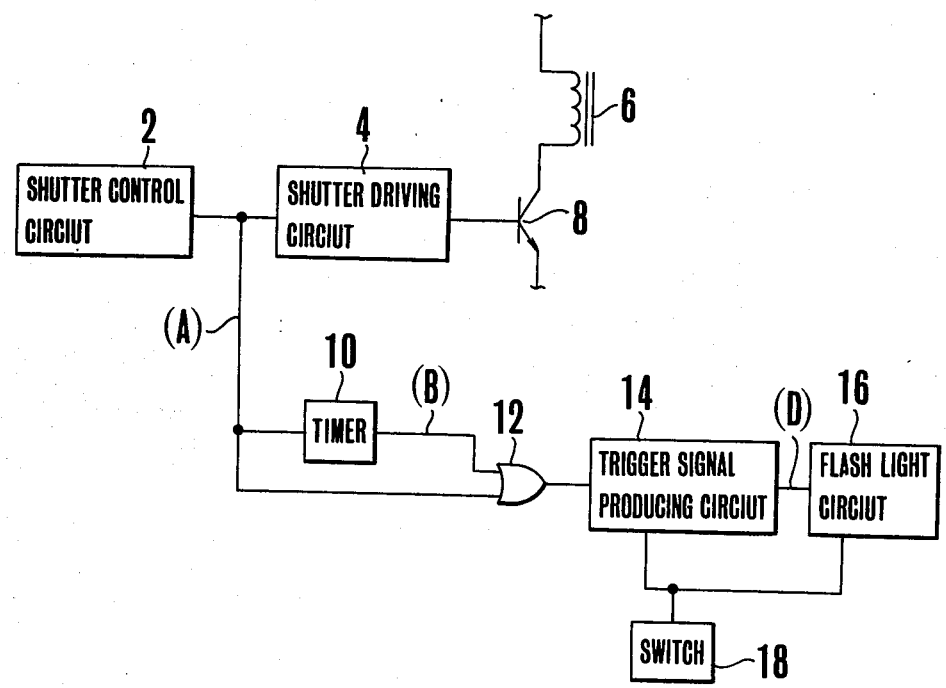
FIG. 1 shows the block diagram of an embodiment of the trigger device for a of the present invention.

FIG. 1 shows the block diagram of an embodiment of the flash trigger device of the present invention. In the drawing, 2 is the shutter control circuit for producing a variable shutter current supply signal in accordance with the brightness of the object, 4 is the shutter driving circuit for supplying the base current to the transistor 8 for amplifying the output signal of the shutter control circuit 2 so as to drive the shutter driving magnet coil 6, 10 is the timer for producing a high level signal for a certain determined time in response to the shutter current supply signal from the shutter control circuit 2, 12 is the OR gate for producing a logic sum of the shutter current supply signal with the output of the timer 10, 14 is the trigger signal producing circuit for producing a signal with the pulse width of a certain predetermined time necessary for triggering the flash in synchronization with the rising up of the output signal of the OR gate 12, 16 is the flash circuit for producing a flash in accordance with the trigger signal from the trigger signal producing circuit 14, and 18 is the switch to be closed when the flashlight device is used, so as to supply current to the flash circuit and transfer, to the trigger signal producing circuit 14, the mode that the trigger signal is to be produced.

Figure 2:
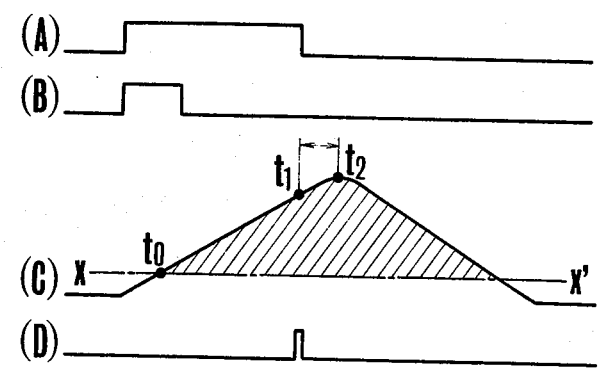
FIGS. 2 and 3 show the time charts for explaining the operation of the construction in FIG. 1, whereby

The operation of the above construction will be explained in accordance with the time charts in FIGS. 2 and 3.

In both of the drawings, (A) is the shutter current supply signal, (B) is the output signal of the timer 10, (C) is the opening state of the shutter blades and (D) is the trigger signal for the flashlight circuit 16. The 1 dot dash line X–X' in (C) is the boundary for the shutter blades to open or to close.

For the daylight photography the switch is not closed and therefore no current is supplied to the flash circuit 16 and the condenser for the flash is not charged. Further, the trigger signal producing circuit 14 is in the nonoperative state and the shutter driving circuit 4 drives the transistor 8 in accordance with the current supply signal from the shutter control circuit 2 so as to supply current to the shutter driving magnet 6 and open the shutter. The shutter control circuit 2 produces a current supply signal, whose length depends upon the brightness of the object, so as to control the aperture and the opening time of the shutter thereby controlling the exposure amount to the film.

On the other hand, in the case of the flash photography, the switch 18 is closed, the current is supplied to the flash circuit 16 and the condenser for the flash is charged. In this state, the flash trigger circuit 14 is in the operative state. Now let us suppose that the object is not bright and the shutter control circuit 2 produces a comparatively long current supply signal; larger than the time constant of the timer 10. Then as is shown in FIG. 2, the shutter blades start to open at time point $t_0$ after the lapse of a certain predetermined time after the start of the current supply and remain opened by means of the strength of the magnet 6. After that, at time $t_1$ when the current supply signal from the shutter control circuit 2 is interrupted, the shutter driving magnet 6 is turned off. At the same time, the level of the output of the OR gate 12 becomes low, the trigger signal producing circuit 14 delivers the trigger signal as is shown in (D) in FIG. 2 and the flash circuit 16 emits the flash. Then, when the inertia of the shutter blades no longer exists, at time $t_2$, the blades start to close and close with the strength of the spring. During the above-mentioned operations, the flash circuit 16 emits the flash when the shutter blades are almost totally opened so that flash photography under daylight can be achieved. Further, if the current supply signal is delivered for a long time when the object is not bright the shutter blades open totally, and the stopper (not shown) actuates the flash when the shutter blades are totally opened. On the other hand, even in the case of a movable camera in which the aperture of the totally opened shutter is varied by means of the stopper, upon the relation of the guide number of the flash device to the object distance, the conditions are the same, with the exception of the position at which the shutter blades are totally opened.

Figure 3:
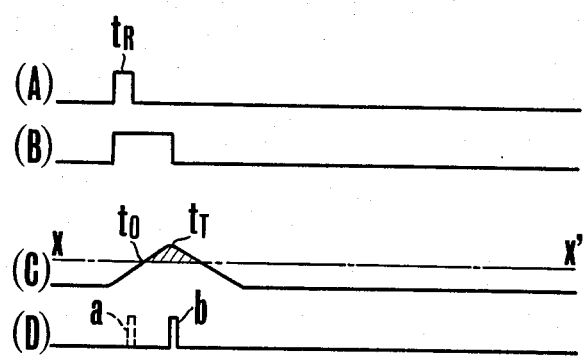

On the other hand, when the object or the background is very bright and the shutter control circuit 2 produces only a very short current supply signal, namely shorter than the time constant of the timer 10, as is shown in FIG. 3 the shutter current supply signal is interrupted at time $t_R$, before time $t_0$, at which the shutter blades are to start to open, so that the shutter blades open inertially. When the shutter blades lose their inertia, at time $t_2$, they start to close and close with the strength of the spring.

If during the above operations, the flash trigger signal is produced in accordance with the current supply stop signal for the shutter blades as is conventional, (shown in (D) in FIG. 3) the flash circuit 16 emits the flash in accordance with the flash trigger signal (a) before the shutter blades have started to open, which means that the daylight synchronized flash photography cannot be achieved. In the case of the present embodiment, even if the current supply signal from the shutter control circuit 2 is interrupted the level of the output signal of the OR gate 12 is kept high by means of the timer 10 for a certain predetermined time, till the shutter blades are opened, in order that no trigger signal is delivered to the flash light circuit 16. After the lapse of a certain predetermined time, after the output signal is produced by the timer 10, which starts to operate at the same time as the rising up of the current supply signal from the shutter control circuit 2, namely at time $t_T$, after the lapse of the time constant of the timer 10, the level of the output signal of the timer 10 becomes low, when the level of the output signal of the OR gate 12 also becomes low and the trigger signal (b) is delivered from the trigger signal producing circuit 14 to the flash circuit 16 so as to emit the flashlight. Because, at this time, the shutter blades are opened as is shown in (C) in FIG. 2, the daylight synchronized photography can be carried out.

In the case of the above embodiment, the high level current supply signal to the shutter driving magnet corresponds to the shutter opening, and the low level current supply signal corresponds to the shutter closing, therefore the present invention is not limited to the present embodiment. The present invention can also be applied to a system in which the shutter opening signal and the shutter closing signal are produced separately, whereby the trigger signal is produced in synchronization with the delay signal from the timer, which starts to operate in synchronization with the shutter opening signal or the shutter closing signal which is produced later than the other, whereby the delay effect is same.

As has explained above, in case of the present invention, it is possible to provide a novel trigger device with which synchronization photography can be obtained even when the object is so bright that the shutter opening time is extremely short. Thus, if the present invention is applied to the camera whose shutter blades are opened electromagnetically and closed with the urging strength of the spring, it is possible to carry out the flash photography in any case, which improves the efficiency of the camera.

What is claimed is:

1. A trigger device for flash comprising:
    shutter control signal producing means for producing a shutter opening and closing operation control signal for opening and closing an electromagnetically driven shutter;
    timer means for producing a delay output signal after the lapse of a certain predetermined time after the timer starts to operate with the shutter opening operation control signal from the shutter control signal producing means; and
    flash trigger signal producing means for producing a trigger signal for causing a flash device to emit the flash in response to the shutter closing operation control signal from the shutter control signal producing means or the delay output signal from the timer means whichever is later when both signals are produced.

2. A trigger device according to claim 1, wherein the shutter closing operation control signal and the delay output signal are respectively a signal corresponding to the rising up of pulse.

3. A trigger device according to claim 1, further comprising an OR circuit to which the output of the shutter control signal producing means and that of the timer means are supplied, the output of the OR circuit being delivered to the flash trigger producing means.

4. A trigger device according to claim 1, wherein the electromagnetically driven shutter is normally urged by a spring to the totally closed position.

5. A trigger device for flash comprising:
shutter control means for producing a current supply signal for actuating electromagnetic means for driving the shutter;
timer means which starts to operate with the current supply signal from the shutter control signal producing means and inverses its output signal after the lapse of a certain predetermined time; and
a flash light trigger device for causing a flash device to emit the flashlight in response to the stop of the current supply signal or the inversed output of the timer means, whichever is later, when the current supply signal from the shutter control means is stopped and the output of the timer means is inversed.

6. A camera comprising:
a shutter device whose shutter blades have a moment of inertia, which needs a certain determined time from the time when a shutter opening operation is started until the shutter has been actually opened and which needs a certain determined time from the time when a shutter closing signal is produced during the shutter opening operation until the shutter starts to actually close;
an electronic flash device; and
an electronic flash trigger device which produces a trigger signal for the electronic flash device after the lapse of a certain determined time from the time when said shutter closing signal is produced until the shutter is actually opened during the period from the time when the driving of the shutter device is driven until the shutter blades of the shutter device are actually opened.

7. An electronic flash trigger device for synchronizing an electronic flash with a shutter device whose shutter blades have a moment of inertia, which needs a certain determined time from the time when a shutter opening operation has been started until the shutter has been actually opened and which needs a certain determined time from the time when the shutter closing signal is produced during the shutter opening operation until the shutter starts to actually close, comprising:
means for producing a trigger signal of the electronic flash device which produces a trigger signal for the electronic flash device after the lapse of a certain determined time from the time when said shutter closing signal is produced until the shutter is actually opened during the period from the time when the shutter device is driven until the shutter blades of the shutter device are actually opened.

8. A camera comprising:
a shutter device which needs a certain determined time from the time when a shutter opening operation has been started until the shutter has been actually opened; and
an electronic flash trigger device which delivers a trigger signal to the electronic flash device synchronized with the camera after the lapse of a certain determined time from the time when said shutter closing signal is produced until the shutter is actually opened during the period from the time when the shutter device is driven until the shutter blades of the shutter device are actually opened.

* * * * *